(12) United States Patent
Baxter et al.

(10) Patent No.: US 10,739,067 B2
(45) Date of Patent: Aug. 11, 2020

(54) COMPONENT REMOVAL FROM A GAS STREAM

(71) Applicants: Larry Baxter, Orem, UT (US);
Christopher Hoeger, Provo, UT (US);
Aaron Sayre, Spanish Fork, UT (US);
Jacom Chamberlain, Provo, UT (US);
Kyler Stitt, Lindon, UT (US)

(72) Inventors: Larry Baxter, Orem, UT (US);
Christopher Hoeger, Provo, UT (US);
Aaron Sayre, Spanish Fork, UT (US);
Jacom Chamberlain, Provo, UT (US);
Kyler Stitt, Lindon, UT (US)

(73) Assignee: Hall Labs LLC, Provo, UT (US)

( * ) Notice: Subject to any disclaimer, the term of this patent is extended or adjusted under 35 U.S.C. 154(b) by 150 days.

(21) Appl. No.: 15/899,719

(22) Filed: Feb. 20, 2018

(65) Prior Publication Data
US 2019/0257580 A1  Aug. 22, 2019

(51) Int. Cl.
| | |
|---|---|
| *F25J 3/02* | (2006.01) |
| *F25J 3/08* | (2006.01) |
| *B01D 43/00* | (2006.01) |
| *B01D 3/14* | (2006.01) |
| *F25B 39/04* | (2006.01) |

(Continued)

(52) U.S. Cl.
CPC ............ *F25J 3/0219* (2013.01); *B01D 3/14* (2013.01); *B01D 43/00* (2013.01); *B01D 53/14* (2013.01); *B01D 53/263* (2013.01); *F25B 39/04* (2013.01); *F25J 3/08* (2013.01); *F28D 1/0246* (2013.01); *B01D 2257/204* (2013.01); *B01D 2257/704* (2013.01); *B01D 2257/7022* (2013.01); *B01D 2257/80* (2013.01); *C09K 5/044* (2013.01); *F25J 2240/82* (2013.01)

(58) Field of Classification Search
CPC .... F25J 3/066; F25J 3/209; F25J 3/219; F25J 3/0233; F25J 2200/70–80; B01D 53/002; B01D 53/263; B01D 9/0009; C01B 32/55; C07C 7/14
See application file for complete search history.

(56) References Cited

U.S. PATENT DOCUMENTS

| | | | |
|---|---|---|---|
| 2007/0292306 A1* | 12/2007 | Hirano | B01D 53/002 422/38 |
| 2008/0016909 A1* | 1/2008 | Lu | C10L 3/10 62/623 |

(Continued)

*Primary Examiner* — Keith M Raymond
*Assistant Examiner* — Webeshet Mengesha

(57) ABSTRACT

In a first aspect, the disclosure provides a method for removing a component from a gas stream. A carrier gas stream is cooled by direct contact with a dehydrating solution stream. The dehydrating solution stream removes a portion of water present in the carrier gas stream and produces a dry gas stream and a wet solution stream. A portion of the component is removed from the dry gas stream by direct contact with a cold contact liquid stream. A depleted gas stream and a slurry stream are produced. Removing the portion of the component may include desublimating, freezing, condensing, depositing, or a combination thereof of the portion of the component out of the dry gas stream as a solid product. The slurry stream may include the solid product and a contact liquid. The solid product is separated from the contact liquid, producing a substantially pure solid product stream and the cold contact liquid stream.

17 Claims, 3 Drawing Sheets

(51) Int. Cl.
  *F28D 1/02* (2006.01)
  *B01D 53/14* (2006.01)
  *B01D 53/26* (2006.01)
  *C09K 5/04* (2006.01)

(56) References Cited

U.S. PATENT DOCUMENTS

| | | | |
|---|---|---|---|
| 2009/0220406 A1* | 9/2009 | Rahman | B01D 53/1468 |
| | | | 423/437.1 |
| 2011/0000133 A1* | 1/2011 | Rhinesmith | B01J 8/0207 |
| | | | 48/127.1 |
| 2011/0265512 A1* | 11/2011 | Bearden | B01D 53/002 |
| | | | 62/617 |
| 2013/0074541 A1* | 3/2013 | Kaminsky | B01D 7/02 |
| | | | 62/601 |
| 2015/0000524 A1* | 1/2015 | Davydov | B01D 53/18 |
| | | | 95/151 |
| 2018/0273850 A1* | 9/2018 | Bhujade | C10L 1/02 |

* cited by examiner

COMPONENT REMOVAL FROM A GAS STREAM

GOVERNMENT INTEREST STATEMENT

This invention was made with government support under DE-FE0028697 awarded by the Department of Energy. The government has certain rights in the invention.

TECHNICAL FIELD

The devices, systems, and methods described herein relate generally to chemical separations. More particularly, the devices, systems, and methods described herein relate to removing individual components from gas streams.

BACKGROUND

The need to separate vapors from gases is common to many industries and is often among the most difficult separation processes. Many techniques are available, but most suffer from energy inefficiencies and poor recovery rates.

SUMMARY

In a first aspect, the disclosure provides a method for removing a component from a gas stream. A carrier gas stream is cooled by direct contact with a dehydrating solution stream. The dehydrating solution stream removes a portion of water present in the carrier gas stream and produces a dry gas stream and a wet solution stream. A portion of the component is removed from the dry gas stream by direct contact with a cold contact liquid stream. A depleted gas stream and a slurry stream are produced. Removing the portion of the component may include desublimating, freezing, condensing, depositing, or a combination thereof of the portion of the component out of the dry gas stream as a solid product. The slurry stream may include the solid product and a contact liquid. The solid product is separated from the contact liquid, producing a substantially pure solid product stream and the cold contact liquid stream.

In other aspects, the substantially pure solid product stream may be melted by indirect contact with an overhead stream, producing a first liquid product stream and a warm liquid stream. The first liquid product stream may be warmed across a recuperative heat exchanger, producing a distillation feed stream. The slurry stream and a first recycle stream may be cooled by indirect contact with a first refrigerant in a contact liquid cooler. The distillation feed stream may be separated into the overhead stream and a bottoms stream in a distillation column. A first portion of the bottoms stream may be cooled and recycled to the distillation column. A second portion of the bottoms stream may be cooled in a bottoms cooler, producing a cold bottoms stream. The cold bottoms stream may be cooled across the recuperative heat exchanger, producing the first recycle stream. The warm liquid stream may be separated into a vapor stream and a second liquid product stream in a gas-liquid separator. The vapor stream is condensed into a third liquid product stream. The third liquid product stream may be cooled across the recuperative heat exchanger, producing a cooled third liquid product stream. A first portion of the second liquid product stream is passed to the distillation column. A second portion of the second liquid product stream may be warmed with the cooled third liquid product stream across the recuperative heat exchanger, producing a final product stream. A portion of the wet solution stream may be cooled across the recuperative heat exchanger, producing a cold solution stream. The cold solution stream may be combined with a dehydrator pre-feed stream, producing the dehydrating solution stream. A warm refrigerant may be cooled to produce the first refrigerant using a first reverse Rankine refrigeration cycle. The recuperative heat exchanger may be cooled using a second reverse Rankine refrigeration cycle.

In other aspects, the carrier gas stream may be cooled by direct contact with the dehydrating solution stream using a direct-contact dehydrating exchanger. The dry gas stream may be cooled by indirect contact with the depleted gas stream using a recuperative indirect-contact heat exchanger. The at least a portion of the component may be removed using a direct-contact desublimating exchanger. The solid product may be separated from the contact liquid using a solid-liquid separator. The substantially pure solid product stream may be melted by indirect contact with the overhead stream using a melter.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
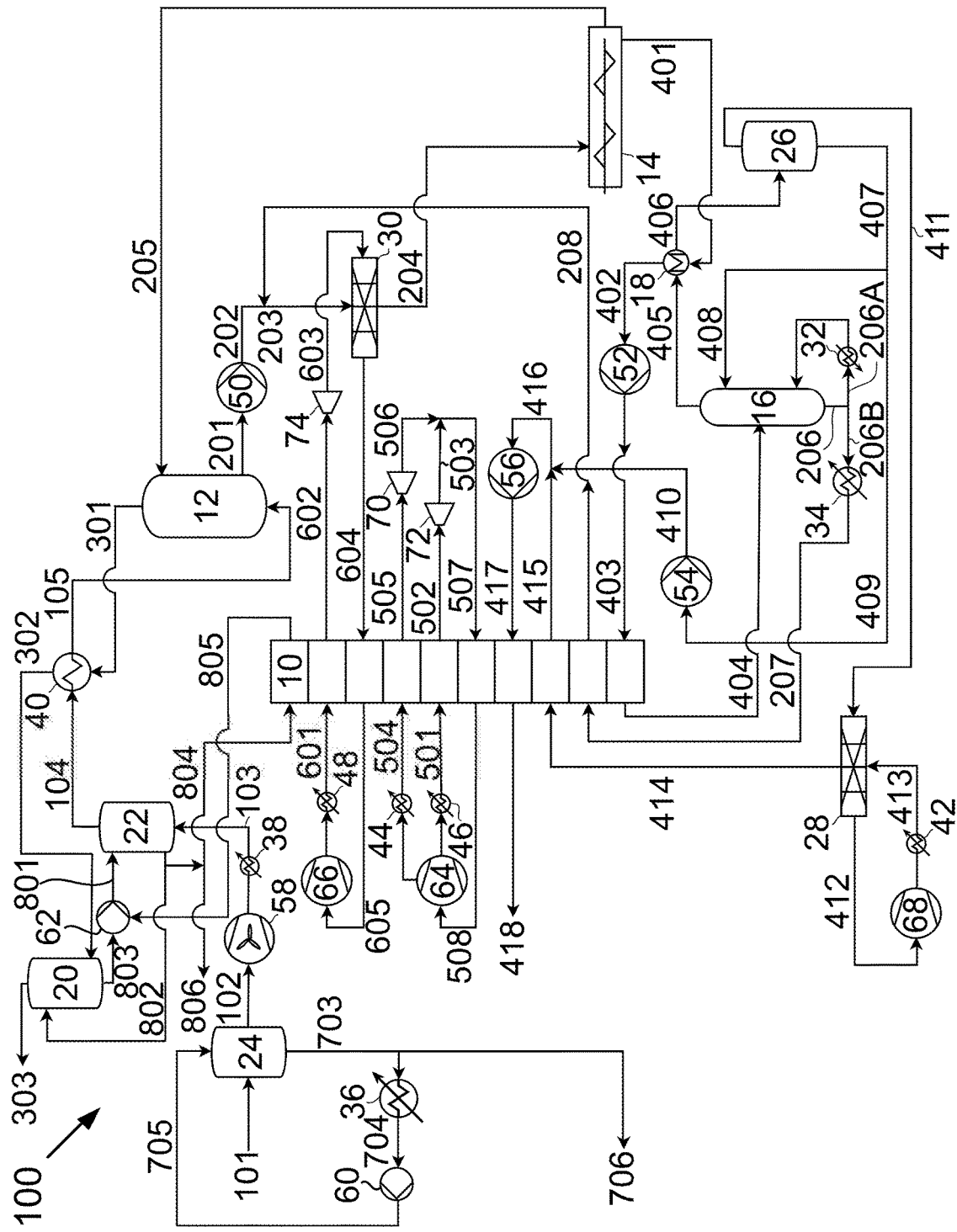
FIG. 1 is a process flow diagram for removing a component from a gas stream.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

As used herein, "cryogenic" is intended to refer to a temperature below about −58° F. (−50° C.).

Now referring to FIG. 1, FIG. 1 is a process flow diagram 100 showing a method for removing a component from a gas that may be used in the devices, methods, and systems disclosed herein. A feed gas stream 101, containing a component to be removed, water, and other constituents, passes through a direct-contact pre-cooler 24 where feed gas stream 101 is cooled by direct contact with cooling water 705 and a portion of the water is stripped and removed with warmed cooling water 703, producing a dehydrated feed gas stream 102. Dehydrated feed gas stream 102 is passed through a blower 58 and aftercooler 38, producing carrier gas stream 103. Carrier gas stream 103 is cooled by direct contact with a dehydrating solution stream 801 in dehydrator 22. Dehydrating solution stream 801 removes a second portion of the water, producing dry gas stream 104 and wet solution streams 802, 804, and 806.

Dry gas stream 104 is cooled by indirect contact with depleted gas stream 301 using a recuperative indirect-contact heat exchanger 40, producing a pre-cooled dry gas stream 105 and a warmed depleted gas stream 302. A portion of the component in pre-cooled dry gas stream 105 is removed from the pre-cooled dry gas stream 105 by direct contact with a cold contact liquid stream 205 in a direct-contact exchanger 12. This produces a depleted gas stream 301 and a slurry stream 201. The portion of the component removed is removed by desublimating, freezing, condensing, depositing, or a combination thereof as a solid product. The slurry stream 201 includes the solid product and a contact liquid.

Slurry stream 201 is pumped by slurry pump 50, resulting in slurry stream 202, which is combined with a first recycle stream 208 to produce combined slurry stream 203. Combined slurry stream 203 is passed through a contact liquid cooler 30 by indirect contact with a first refrigerant 603 to produce cooled slurry stream 204 and spent refrigerant 604. Cooled slurry stream 204 passes through a solid-liquid separator 14 where the solid product is removed from the contact liquid, producing a substantially pure solid carbon dioxide product stream 401 and the cold contact liquid stream 205. The substantially pure solid product stream 401 is melted by indirect contact with an overhead stream 405 in a melter 18, producing a first liquid product stream 402 and a warm liquid stream 406. The first liquid product stream 402 is pumped by melter pump 52 and passed as first liquid product stream 403 across a recuperative heat exchanger 10, producing a distillation feed stream 404.

The substantially pure solid product stream is at least 93 wt % pure. In a more preferred embodiment, the substantially pure solid product stream is at least 98 wt % pure. In an even more preferred embodiment, the substantially pure solid product stream is at least 99.3 wt % pure.

Distillation feed stream 404 is separated into overhead stream 405 and bottoms stream 206 in distillation column 16. Bottoms stream 206 splits into a first portion 206A and a second portion 206B. First portion 206A is recycled to the distillation column 16 through reboiler 32. Second portion 206B is cooled in bottoms cooler 34 producing a cold bottoms stream 207. Cold bottoms stream 207 is cooled across recuperative heat exchanger 10, producing first recycle stream 208.

Warm liquid stream 406 is passed into a gas-liquid separator 26 and separated into a vapor stream 411 and a second liquid product stream 407. Second liquid product stream 407 splits into a first portion 408 and a second portion 409. Vapor stream 411 is cooled across a recuperative heat exchanger 28, compressed by compressor 68, and cooled by aftercooler 42, and then warmed across recuperative heat exchanger 28, producing a third liquid product stream 413. Third liquid product stream 414 is cooled across the recuperative heat exchanger 10, producing a cooled third liquid product stream 415. First portion 408 is passed to distillation column 16. Second portion 409 is pumped by pump 54 and resultant stream 410 is combined with cooled third liquid product stream 415, resulting in combined liquid product stream 416. Combined liquid product stream 416 is pumped by pump 56 and warmed across recuperative heat exchanger 10, producing a final product stream 418.

Wet solution stream 804 is cooled across the recuperative heat exchanger 10, producing a cold solution stream 805 which is combined with dehydrator pre-feed stream 803 in pump 62 and pumped as dehydrating solution stream 801. Wet solution stream 802 is passed to recuperator 20. Warmed depleted gas stream 302 is also passed through recuperator 20, producing a light gas product stream 303. Dehydrator pre-feed stream 803 is produced from recuperator 20. Wet solution stream 806 is discharged as a brine discharge.

First Reverse Rankine Refrigeration Cycle—A warm refrigerant 601 is cooled across recuperative heat exchanger 10 to produce a cooled refrigerant 602. Cooled refrigerant 602 is expanded across turbine 74 producing first refrigerant 603. After first refrigerant 603 cools combined slurry stream 203, resulting in spent first refrigerant 604, which is warmed across recuperative heat exchanger 10, resulting in warmed spent refrigerant 605. Warmed refrigerant 605 is compressed by compressor 66 and cooled by aftercooler 48, resulting in warm refrigerant 601.

Second Reverse Rankine Refrigeration Cycle—Recuperative heat exchanger 10 is cooled by the second reverse Rankine refrigeration cycle. Warm second refrigerant 508 is compressed across by compressor 64, split, and cooled in parallel across aftercoolers 44 and 46, resulting in cold second refrigerant streams 504 and 501, respectively, which are warmed across recuperative heat exchanger 10, resulting in warmed compressed second refrigerant streams 502 and 505, respectively. These are expanded across turbines 72 and 70, respectively, resulting in warm second refrigerant stream 503 and 506, respectively, and are combined to produce second refrigerant stream 507 which is warmed across recuperative heat exchanger 10 to produce warm second refrigerant 508.

A warm refrigerant 601 is cooled across recuperative heat exchanger 10 to produce a cooled refrigerant 602. Cooled refrigerant 602 is expanded across turbine 74 producing first refrigerant 603. After first refrigerant 603 cools combined slurry stream 203, resulting in spent first refrigerant 604, which is warmed across recuperative heat exchanger 10, resulting in warmed spent refrigerant 605. Warmed refrigerant 605 is compressed by compressor 66 and cooled by aftercooler 48, resulting in warm refrigerant 601.

The amount of water removed from flue gas stream 101 is removed from warmed cooling water 703 as output water 706. The balance is cooled across water cooler 36 and pumped by pump 60 as cooling water 705.

In some embodiments, the carrier gas stream may be flue gas, syngas, producer gas, natural gas, steam reforming gas, hydrocarbons, light gases, refinery off-gases, organic solvents, steam, ammonia, or a combination thereof.

In some embodiments, the component being removed from the carrier gas stream may be nitrogen oxide, sulfur dioxide, nitrogen dioxide, sulfur trioxide, hydrogen sulfide, hydrogen cyanide, water, mercury, hydrocarbons, pharmaceuticals, ammonia, or a combination thereof.

In some embodiments, the contact liquid may be water, hydrocarbons, liquid ammonia, liquid carbon dioxide, cryogenic liquids, or a combination thereof. The hydrocarbons may be 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or a combination thereof.

In other embodiments, the contact liquid stream may be a mixture of a solvent and an ionic compound. The ionic compound may be potassium carbonate, potassium formate, potassium acetate, calcium magnesium acetate, magnesium chloride, sodium chloride, lithium chloride, calcium chloride, or a combination thereof. The solvent may be any of the contact liquids in the previous paragraph.

In other embodiments, the contact liquid stream may be a mixture of a solvent and a soluble organic compound. The soluble organic compound may be glycerol, ammonia, propylene glycol, ethylene glycol, ethanol, methanol, or a combination thereof. The solvent may be any of the contact liquids two paragraphs previous.

In some embodiments, the dehydrating solution stream may be a mixture of a solvent and an ionic compound. The ionic compound may be potassium carbonate, potassium formate, potassium acetate, calcium magnesium acetate, magnesium chloride, sodium chloride, lithium chloride, calcium chloride, or a combination thereof. The solvent may be water, hydrocarbons, liquid ammonia, liquid carbon dioxide, cryogenic liquids, or a combination thereof.

In other embodiments, the dehydrating solution stream may be a mixture of a solvent and a soluble organic compound. The soluble organic compound may be glycerol, ammonia, propylene glycol, ethylene glycol, ethanol, methanol, or a combination thereof. The solvent may be water, hydrocarbons, liquid ammonia, liquid carbon dioxide, cryogenic liquids, or a combination thereof.

Figure 2:
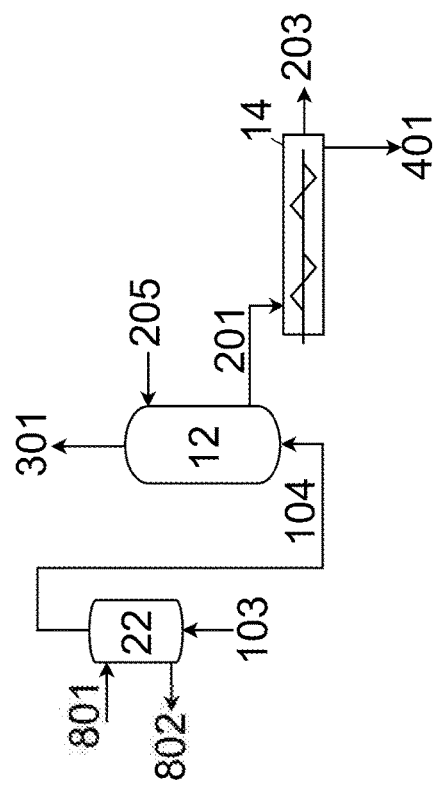
FIG. 2 is a process flow diagram for removing a component from a gas stream.

Referring now to FIG. 2, FIG. 2 is a is a process flow diagram 200 showing a method for removing a component from a gas that may be used in the devices, methods, and systems disclosed herein. Carrier gas stream 103 is cooled by direct contact with a dehydrating solution stream 801. Dehydrating solution stream 801 removes a portion of the water, producing dry gas stream 104 and wet solution stream 802. A portion of the component in dry gas stream 104 is removed from the dry gas stream 104 by direct contact with a cold contact liquid stream 205. This produces a depleted gas stream 301 and a slurry stream 201. The portion of the component removed is removed by desublimating, freezing, condensing, depositing, or a combination thereof the portion of the component out of the dry gas stream 104 as a solid product. The slurry stream 201 includes the solid product and a contact liquid. The solid product is removed from the contact liquid, producing a substantially pure solid product stream 401 and a contact liquid stream 203.

Figure 3:
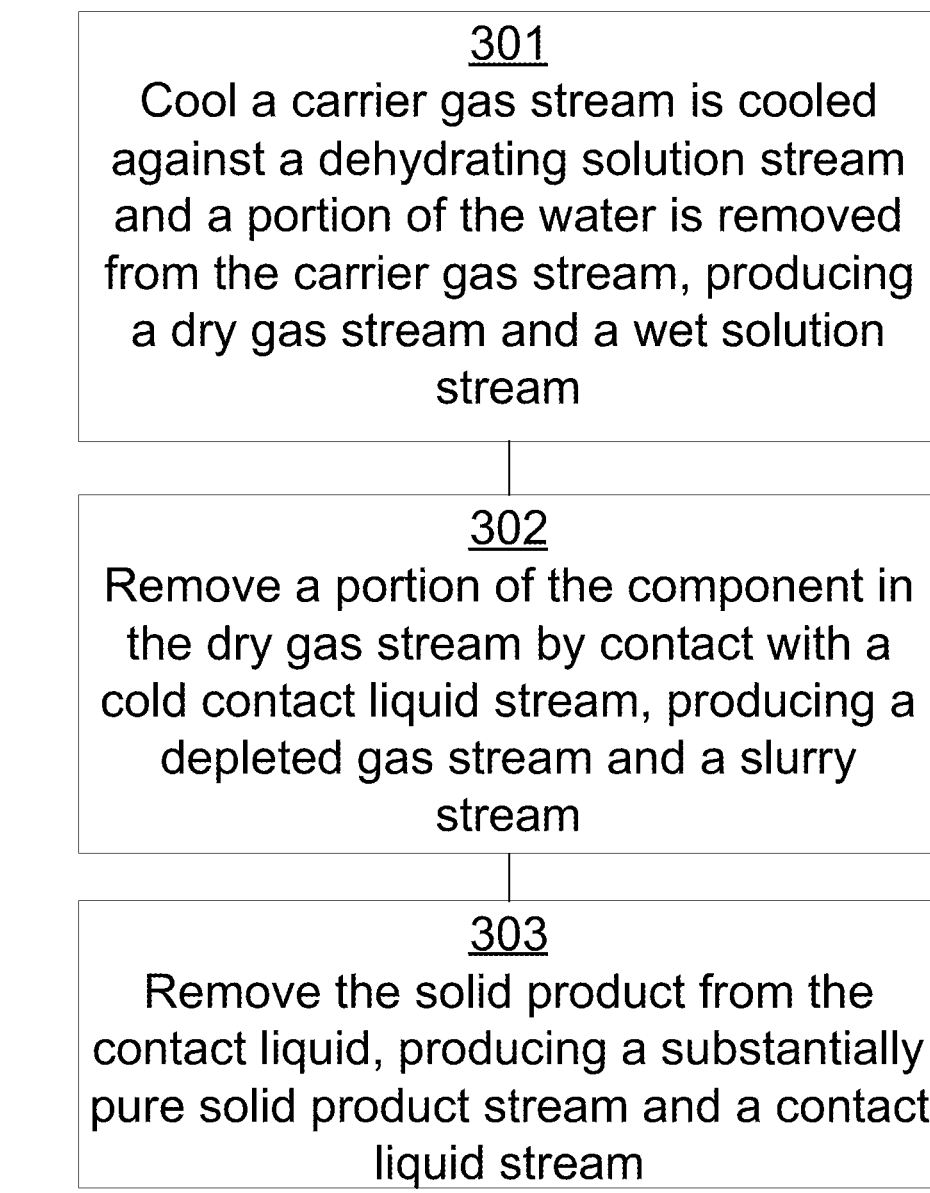
FIG. 3 is a method for removing a component from a gas stream.

Referring now to FIG. 3, FIG. 3 is a method 300 for removing a component from a gas that may be used in the devices, methods, and systems disclosed herein. At 301, a carrier gas stream is cooled by direct contact with a dehydrating solution stream and a portion of the water is removed from the carrier gas stream, producing a dry gas stream and a wet solution stream. At 302, a portion of the component in the dry gas stream is removed by contact with a cold contact liquid stream, producing a depleted gas stream and a slurry stream. The portion of the component removed is removed by desublimating, freezing, condensing, depositing, or a combination thereof the portion of the component out of the dry gas stream as a solid product. The slurry stream includes the solid product and a contact liquid. At 303, the solid product is removed from the contact liquid, producing a substantially pure solid product stream and a contact liquid stream.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. A method for removing a component from a gas stream comprising:
    cooling a carrier gas stream by direct contact with a dehydrating solution stream, the dehydrating solution stream removing a portion of water present in the carrier gas stream and producing a dry gas stream and a wet solution stream;
    removing a portion of the component from the dry gas stream by desublimating, freezing, condensing, depositing, or a combination thereof through direct contact with a cold contact liquid stream, producing a depleted gas stream and a slurry stream, wherein the portion of the component is removed as a solid product, and wherein the slurry stream comprises the solid product and a contact liquid;
    separating the solid product from the contact liquid, producing a solid product stream and a contact liquid stream;
    melting the solid product stream by indirect contact with an overhead stream, producing a first liquid product stream and a warm liquid stream and warming the first liquid product stream across a recuperative heat exchanger, producing a distillation feed stream;
    cooling the slurry stream and a first recycle stream by indirect contact with a first refrigerant in a contact liquid cooler; and
    separating the distillation feed stream into the overhead stream and a bottoms stream in a distillation column, cooling a first portion of the bottoms stream, recycling the first portion of the bottoms stream to the distillation column, and cooling a second portion of the bottoms stream in a bottoms cooler, producing a cold bottoms stream.

2. The method of claim 1, further comprising cooling the cold bottoms stream across the recuperative heat exchanger, producing the first recycle stream.

3. The method of claim 2, further comprising separating the warm liquid stream into a vapor stream and a second liquid product stream in a gas-liquid separator.

4. The method of claim 3, further comprising condensing the vapor stream into a third liquid product stream.

5. The method of claim 4, further comprising cooling the third liquid product stream across the recuperative heat exchanger, producing a cooled third liquid product stream.

6. The method of claim 5, further comprising passing a first portion of the second liquid product stream to the distillation column and warming a second portion of the second liquid product stream with the cooled third liquid product stream across the recuperative heat exchanger, producing a final product stream.

7. The method of claim 6, further comprising cooling a portion of the wet solution stream across the recuperative heat exchanger, producing a cold solution stream, and combining the cold solution stream with a dehydrator pre-feed stream, producing the dehydrating solution stream.

8. The method of claim 7, further comprising cooling a warm refrigerant to produce the first refrigerant using a first reverse Rankine refrigeration cycle, cooling the recuperative heat exchanger using a second reverse Rankine refrigeration cycle, or a combination thereof.

9. The method of claim 1, wherein cooling the carrier gas stream by direct contact with the dehydrating solution stream uses a direct-contact dehydrating exchanger, removing the at least the portion of the component uses a direct-contact desublimating exchanger, separating the solid product from the contact liquid uses a solid-liquid separator, or a combination thereof.

10. The method of claim 1, further comprising cooling the dry gas stream by indirect contact with the depleted gas stream using a recuperative indirect-contact heat exchanger.

11. The method of claim 1, wherein the carrier gas stream comprises flue gas, syngas, producer gas, natural gas, steam reforming gas, hydrocarbons, light gases, refinery off-gases, organic solvents, steam, ammonia, or a combination thereof.

12. The method of claim 1, wherein the component comprises nitrogen oxide, sulfur dioxide, nitrogen dioxide, sulfur trioxide, hydrogen sulfide, hydrogen cyanide, water, mercury, hydrocarbons, pharmaceuticals, ammonia, or a combination thereof.

13. The method of claim 1, wherein the contact liquid comprises water, hydrocarbons, liquid ammonia, liquid carbon dioxide, cryogenic liquids, or a combination thereof.

14. The method of claim 1, wherein the contact liquid stream may be a mixture of a solvent and an ionic compound, the solvent comprising water, hydrocarbons, liquid ammonia, liquid carbon dioxide, cryogenic liquids, or a combination thereof, and the ionic compound comprising potassium carbonate, potassium formate, potassium acetate, calcium magnesium acetate, magnesium chloride, sodium chloride, lithium chloride, calcium chloride, or a combination thereof.

15. The method of claim 1, wherein the contact liquid stream comprises a mixture of a solvent and a soluble organic compound, the solvent comprising water, hydrocarbons, liquid ammonia, liquid carbon dioxide, cryogenic liquids, or a combination thereof, and the soluble organic compound comprising glycerol, ammonia, propylene glycol, ethylene glycol, ethanol, methanol, or a combination thereof.

16. The method of claim 1, wherein the dehydrating solution stream may be a mixture of a solvent and an ionic compound, the solvent comprising water, hydrocarbons, liquid ammonia, liquid carbon dioxide, cryogenic liquids, or a combination thereof, and the ionic compound comprising potassium carbonate, potassium formate, potassium acetate, calcium magnesium acetate, magnesium chloride, sodium chloride, lithium chloride, calcium chloride, or a combination thereof.

17. The method of claim 1, wherein the dehydrating solution stream comprises a mixture of a solvent and a soluble organic compound, the solvent comprising water, hydrocarbons, liquid ammonia, liquid carbon dioxide, cryogenic liquids, or a combination thereof, and the soluble organic compound comprising glycerol, ammonia, propylene glycol, ethylene glycol, ethanol, methanol, or a combination thereof.

* * * * *